Nov. 23, 1926.
A. W. HANNAH
BRAKE ATTACHMENT
Filed Sept. 18, 1925
1,608,392
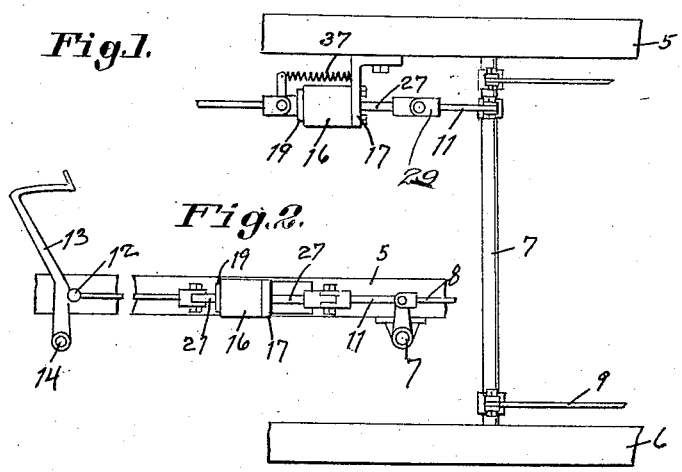
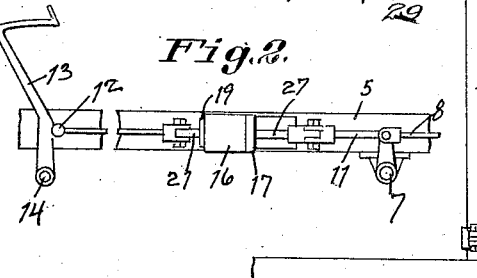
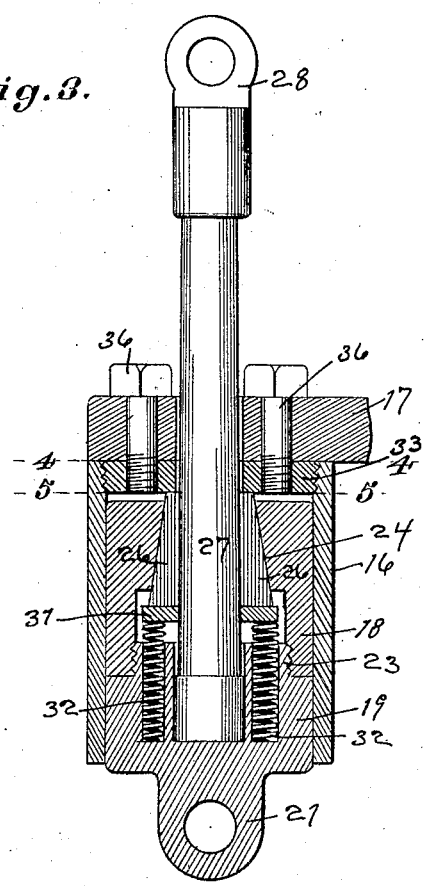
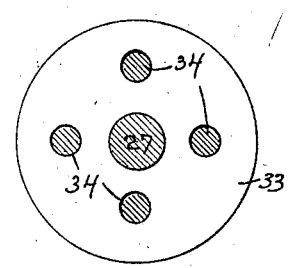
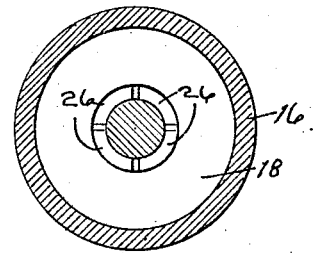
Inventor.
ARTHUR, W HANNAH
By Victor J Evans
Attorney.

Patented Nov. 23, 1926.

1,608,392

UNITED STATES PATENT OFFICE.

ARTHUR W. HANNAH, OF SAN FRANCISCO, CALIFORNIA.

BRAKE ATTACHMENT.

Application filed September 18, 1925. Serial No. 57,223.

This invention relates to brake attachments and has particular reference to an attachment for use with brakes of motor vehicles for the purpose of keeping the brakes, at the proper adjustment, at all times, when the vehicle is under load or empty.

A further object of this invention is to produce a device of this character which may be inserted in the customary braking mechanism without materially altering the same.

Another object of this invention is to produce a device of this character which is simple in construction and, therefore, cheap to manufacture.

An additional object of this invention is to produce a device of this character which will operate equally well under all conditions and will incidentally re-adjust itself as the conditions change.

Other objects and advantages will be apparent during the course of the following description.

In the accompanying drawings forming a part of this specification, and in which like numerals are employed to designate like parts throughout the same, Figure 1 is a fragmentary top plan view showing my device applied to the brake mechanism of an automobile, Figure 2 is a side elevation of Figure 1, Figure 3 is an enlarged detail cross section of my device, Figure 4 is a cross section taken on the line 4—4 of Figure 3, and Figure 5 is a cross section taken on the line 5—5 of Figure 3.

When the brakes of an automobile are properly adjusted a movement of a quarter of an inch may be sufficient to cause the brakes to drag. If they are not properly adjusted then the brakes will not take hold until the foot lever has been pushed through a considerable arc with the result that there is very little additional room to push the foot pedal which additional amount is soon used up by the settling of the brakes after a short time in use. Therefore, it is customary to set the brakes as tight as possible when adjusting the same, of course, not permitting them to drag, and in doing this it is found that when the vehicle is loaded, the downward movement of the springs will cause the rear axle to move rearwardly a slight distance. This, however, is sufficient to shorten the brake rod and make the brakes drag.

It is to overcome this difficulty and to provide a device which will permit the brakes to be properly adjusted, at all times, that I have produced this invention.

In the accompanying drawings wherein for the purpose of illustration is shown a preferred embodiment of my invention, the numerals 5 and 6 refer to the side frames of an automobile between which is a customary equalizing bar 7.

At 8 and 9 I have shown the rods extending to the rear brakes from the equalizing bar 7. Extending forwardly from the equalizing bar is the brake rod 11 within which my device is inserted, it being understood that the opposite end of the brake rod 11 is connected as at 12 to the brake pedal 13 which brake pedal is, in turn, pivoted as shown at 14.

Referring now to my device, the same consists of a cylinder 16 supported from the frame 5 by a bracket 17. Within the cylinder 16 is a piston composed of two blocks as shown at 18 and 19, the block 19 having an eye 21 which is connected to the clevis secured to that portion of the brake rod extending to and connected with the foot pedal. This block 19 has a hub portion 23 which is externally threaded so as to engage an internal thread upon the block 18. This block 18 has a tapered bore 24 within which a plurality of tapered wedges 26 are positioned, which wedges, in turn, engage a tapered rod 27 which extends through the bracket 17 and has an eye 28 formed thereon, which is connected to a clevis 29 formed upon the brake rod 11.

A washer 31 bears upon the undersurface of the wedges 26 and is kept in contact therewith by a plurality of springs 32. The cylinder 16 may be secured to the bracket 17 in any suitable manner, but I have here shown a disc 33 which is screwed into the cylinder 16. This disc is provided with a plurality of holes 34 into which bolts 36 are adapted to be screwed. The result of this construction is that when under normal conditions and the brakes are released, the spring 37 connected to the clevis and to the bracket 17 causes the piston to move into the cylinder 16 with sufficient tension to cause the ends of the wedges 26 to be pushed into the block 18 against the tension of the springs 32.

The rod 27 is then free to move in or out as the condition may be. Immediately as soon as the brake pedal 13 is moved forwardly the pull upon the eye 21 will move the piston as a whole out of the cylinder 16 and immediately the wedges 26 will grasp the rod 27 and further movement of the brake pedal will cause the proper contraction of the brakes.

It will thus be seen that I have produced a very simple device and one in which the brake rods will always automatically adjust themselves for any differences in loading upon the vehicle.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a brake adjusting mechanism, a cylinder, a piston movable in said cylinder, means for connecting said piston to the brake pedal of an automobile, a rod slidably positioned in said piston, and means for adjustably clamping said rod in said piston, for the purpose specified.

2. In an adjusting mechanism for automobile brakes, a bracket adapted to be supported in the frame of an automobile, a cylinder secured to said bracket, a piston slidably supported in said cylinder, means for normally retaining said piston within said cylinder, a rod extending through said supporting bracket and entering said piston, a plurality of wedges slidably positioned in said piston and adapted to engage said rod, said wedges contacting the end of said cylinder when said piston is in its normal position, and means for moving said wedges into contact with said rod when the ends of said wedges are moved out of contact with the ends of said cylinder.

3. In a brake adjusting mechanism for an automobile, a bracket adapted to be attached to the frame of an automobile, a cylinder supported upon said bracket, a piston slidably supported in said cylinder, said piston being connected to the brake pedal of said automobile, a rod slidably positioned in said piston, said rod having one end connected to the brake mechanism of said automobile, a plurality of wedges adapted to engage the other end of said rod, means for causing said wedges to be kept in contact with said rod when said piston is being moved out of said cylinder.

In testimony whereof I affix my signature.

ARTHUR "W" HANNAH.